United States Patent Office 3,461,126
Patented Aug. 12, 1969

3,461,126
2-ALKANOYL-11-PIPERAZINO-DIBENZOCYCLO-HEPTADIENE DERIVATIVES
Jean Clement Louis Fouche, Bourg-la-Reine, France, assignor to Rhone-Poulenc S.A., Paris, France, a French body corporate
No Drawing. Filed Jan. 16, 1967, Ser. No. 609,308
Claims priority, application France, Jan. 25, 1966, 47,172
Int. Cl. C07d *51/70*; A61k *27/00*
U.S. Cl. 260—268                                   2 Claims

ABSTRACT OF THE DISCLOSURE

The invention provides new 2-alkanoyl-substituted 11-piperazino-dibenzo[a,d]cycloheptadienes and their salts having interesting pharmacodynamic properties on the central nervous system as, e.g. neuroleptics, sedatives and antidepressants.

---

This invention relates to dibenzo[a,d]cycloheptadiene derivatives and their preparation.

The invention provides the dibenzo[a,d]cycloheptadiene derivatives of the formula:

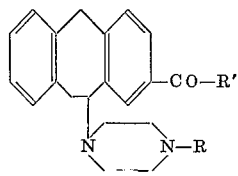

(I)

and their acid addition salts and quaternary ammonium derivatives; wherein R is hydrogen, alkyl of 1 to 5 carbon atoms, hydroxyalkyl of 1 to 5 carbon atoms, hydroxyalkoxyalkyl of 1 to 5 carbon atoms in each alkyl residue, alkenyl of 2 to 5 carbon atoms, alkynyl of 2 to 5 carbon atoms, phenyl, phenylalkyl of 1 to 5 carbon atoms in the alkyl residue, phenylalkenyl of 2 to 5 carbon atoms in the alkenyl residue, the said phenyl, phenylalkyl, and phenylalkenyl residues being unsubstituted or substituted by one or more halogen atoms, or alkyl radicals of 1 to 5 carbon atoms, alkoxy radicals of 1 to 5 carbon atoms, nitro, amino, or trifluoromethyl radicals; R' is alkyl of 1 to 5 carbon atoms; and the carbon atoms of the piperazine nucleus may be substituted by one or more methyl groups.

According to a feature of the invention, the compounds of Formula I and their acid addition salts and quaternary ammonium derivatives are prepared by reacting an organometallic compound of the formula:

$$\text{R'—Me} \qquad \text{(II)}$$

where Me represents the metal residue of the said compounds, for example a lithium atom or a magnesium halide residue, and R' is as hereinbefore defined, with a compound of the formula:

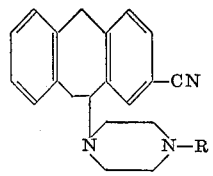

(III)

where R is as hereinbefore defined and the carbon atoms of the piperazine nucleus may be substituted by one or more methyl groups, hydrolysing the product, and, if desired, converting an obtained dibenzo[a,d]cycloheptadiene base of Formula I into an acid addition salt or quaternary ammonium derivative thereof.

The initial reaction is carried out under the usual conditions for the preparation of ketones from nitriles by the action of an organometallic derivative, i.e. by performing the reaction in an anhydrous organic solvent such as ether. The hydrolysis is also effected in conventional manner.

According to a further feature of the invention, the compounds of Formula I in which R is other than hydrogen or a phenyl radical, and their acid addition salts and quaternary ammonium derivatives, are prepared by reacting an ester of the formula:

$$\text{Y—R''} \qquad \text{(IV)}$$

where Y is a reactive ester residue such as a halogen atom, a sulphuric ester residue (for example methoxysulphonyloxy) or a sulphonic ester residue (for example toluene-p-sulphonyloxy or methanesulphonyloxy), and R'' is the same as R as hereinbefore defined but other than hydrogen or a phenyl radical, with a dibenzo[a,d]cycloheptadiene derivative of Formula I in which R is hydrogen, i.e. an 11-piperazinodibenzo[a,d]cycloheptadiene of the formula:

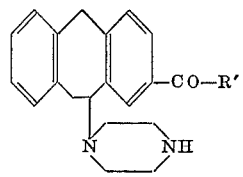

(V)

in which R' is as hereinbefore defined and the carbon atoms of the piperazine nucleus may be substituted by one or more methyl groups, and, if desired, converting an obtained base of Formula I, in which R is other than hydrogen or a phenyl radical, into an acid addition salt or quaternary ammonium derivative thereof.

It is advantageous to carry out the reaction in an inert organic solvent such as ethanol, preferably at the boiling temperature of the solvent, and to use as condensing agent an excess of the compound of the Formula V.

The dibenzo[a,d]cycloheptadiene derivatives of the Formula III may be prepared by one of the following two methods:

(a) Action of a reactive ester of the formula:

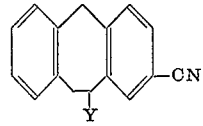

(VI)

in which Y is as hereinbefore defined, or a piperazine of the formula:

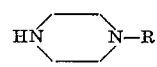

(VII)

in which R is as hereinbefore defined and the carbon atoms of the piperazine nucleus may be substituted by one or more methyl groups. It is advantageous to carry out the reaction in an inert organic solvent such as an aromatic hydrocarbon, preferably at the boiling temperature of the solvent, and to use as condensing agent an excess of the piperazine of the general Formula VII.

(b) When R represents neither a hydrogen atom nor a phenyl radical, action of a reactive ester of the formula:

$$\text{Y—R''} \qquad \text{(VIII)}$$

in which Y and R'' are as hereinbefore defined, on an 11-piperazinodibenzo[a,d]cycloheptadiene of the formula:

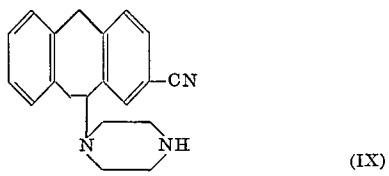

in which the carbon atoms of the piperazine nucleus may be substituted by one or more methyl groups. It is advantageous to carry out the operation in an inert organic solvent such as ethanol, preferably at the boiling temperature of the solvent, and to use as condensing agent an excess of the compound of the Formula IX.

The compounds of Formula VI may be prepared from the corresponding alcohol of the formula:

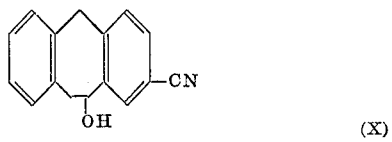

by known methods for preparing reactive esters from the corresponding alcohols. By "known methods" is meant methods heretofore used or described in the chemical literature.

The alcohol of Formula X may be prepared by reduction of the corresponding ketone of the formula:

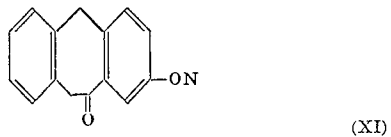

This reduction may be carried out in accordance with known methods for reducing ketones to alcohols, which leave intact the cyano group, for example by the action of an alkali metal borohydride.

The compound of the Formula XI may be prepared from a 2-halogeno-11-oxodibenzo[a,d]cycloheptadiene using known methods for converting halogeno derivatives into cyano derivatives.

2 - halogeno-11-oxodibenzo[a,d]cycloheptadienes may be obtained by cyclisation of compounds of the formula:

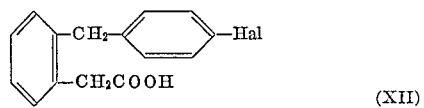

in which Hal represents a halogen atom, for example bromine. This cyclisation is advantageously carried out by heating the compound of Formula XII in the presence of polyphosphoric acid or one of its esters, preferably at a temperature between 60° and 180° C.

The compounds of Formula XII may be prepared from an o-benzylbenzoic acid of the formula:

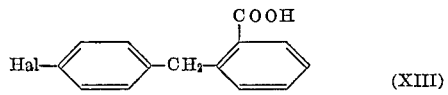

by known methods for changing an acid into its higher homologue. For example, the acid of Formula XIII is first esterified by reaction with methyl alcohol and the ester obtained is reduced to give the alcohol of the formula:

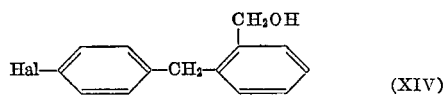

This alcohol, when treated with an appropriate halogenating agent, more particularly with a chlorinating agent, such as, e.g. thionyl chloride, or with a brominating agent, such as hydrobromic acid, gives a compound of the formula:

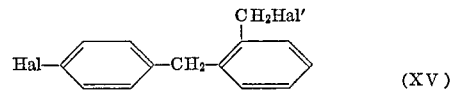

in which Hal' represents a halogen atom, more particularly chlorine. By the action of an alkali metal cyanide, the compound of Formula XV gives a nitrile of formula:

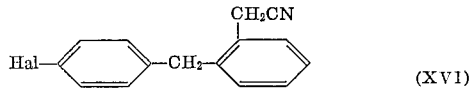

hydrolysis of which leads to the desired acid of Formula XII.

The acids of the Formula XIII may be prepared by known methods. A preferred such method consists in reacting phthalic anhydride under Friedel-Crafts reaction conditions, with a compound of the formula:

in which Hal is as hereinbefore defined, to form an o-aroylbenzoic acid of the formula:

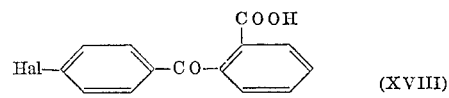

and then reducing the latter to obtain the desired acid of Formula XIII. This reduction may be carried out by known methods, for example with hydrogen in the presence of a hydrogenation catalyst such as palladium, or by the action of a reducing agent such as zinc in an ammoniacal medium.

The compounds of Formula I may optionally be purified by physical methods (such as distillation, crystallisation or chromatography) or by chemical methods (such as the formation of the salts, crystallisation of the latter, followed by their decomposition in alkaline medium). In these operations, the nature of the anion of the salt is unimportant, the only condition being that the salt must be well defined and readily crystallisable.

The new compounds may be converted into acid addition salts and into quaternary ammonium derivatives. The acid addition salts may be obtained by the action of the new compounds on acids in appropriate solvents. Suitable organic solvents are alcohols, ethers, ketones or chlorinated solvents. The salt formed precipitates, after optional concentration of the solution, and is separated by filtration or decantation. The quaternary ammonium salts may be obtained by the reaction of the new bases with esters, optionally in an organic solvent, at ordinary temperature or more rapidly with moderate heating.

The new compounds, both as bases and as their acid addition salts and quaternary ammonium derivatives, have interesting pharmacodynamic properties. More particularly, they are very active on the central nervous system, acting as neuroleptics, sedatives and antidepressants. They also show good antihistamine, antiserotonin, analgesic, spasmolytic and anti-emetic activity. They have given good results in physiological tests on animals in roses of 0.1 to 10 mg. per kg. of animal weight administered orally.

For therapeutic purposes, the compounds of Formula I are employed either as free bases or in the form of pharmaceutically acceptable acid addition salts or quaternary ammonium derivatives, i.e. salts and derivatives which are not toxic in the doses in which they are employed. Suitable pharmaceutically acceptable acid addition salts include salts with mineral acids (such as hydrochlorides and other hydrohalides, sulphates, nitrates and phosphates) or with organic acids (such as acetates, propionates, succinates, benzoates, fumarates, maleates, theophyllineacetates, salicylates, and methylene - bis - β- hydroxynaphthoates) and substituted derivatives of these acids. Examples of pharmaceutically acceptable quaternary ammonium derivatives include derivatives obtained by reaction of the bases with esters of mineral or organic acids such as methyl, ethyl, allyl or benzyl chloride, bromide or iodide, methyl or ethyl sulphate, benzenesulphonate, or toluene-p-sulphonate or substiuted derivatives of these compounds.

The following examples illustrate the invention.

Example I

To a solution of methyl-lithium in anhydrous diethyl ether (prepared by the action of 6.9 g. of methyl iodide on 0.77 g. of lithium in 50 cc. of anhydrous diethyl ether), cooled to −20° C., are added 5.6 g. of 2 - cyano - 11- (4 - methyl - 1 - piperazinyl)dibenzo[a,d]cycloheptadiene. The reaction mixture is allowed to return to ambient temperature in 30 minutes and is then heated under reflux for two hours. After cooling, the reaction mixture is treated with 60 cc. of distilled water and 50 cc. of diethyl ether. After stirring for 30 minutes, 60 cc. of 4 N sulphuric acid are added. The decanted ethereal solution is twice extracted with a total of 100 cc. of 2 N sulphuric acid. The acid solutions are combined and washed with 25 cc. of diethyl ether. The washed solution is then heated at 100° C. for two hours, and, after cooling, 100 cc. of methylene chloride and 50 cc. of 10 N sodium hydroxide solution are added. The aqueous solution is separated and twice extracted with a total of 160 cc. of diethyl ether. The combined organic solutions are washed to neutrality with distilled water (180 cc. in all), dried over anhydrous sodium sulphate, and evaporated. The residue (4.83 g.) is dissolved in 500 cc. of benzene containing 5% (by volume) of ethyl acetate. The solution obtained is passed over 50 g. of neutral alumina contained in a cylindrical column of 14 mm. diameter. The product is eluted with 2000 cc. of benzene containing 5% by volume of ethyl acetate. 3.7 g. of product are collected and then dissolved in 12.5 cc. of boiling isopropanol. After cooling for 17 hours at 3° C., the crystals which have appeared are separated, twice washed with a total of 5 cc. of ice-cold isopropanol, and dried under reduced pressure. 2.7 g. of 2 - acetyl - 11 - (4 - methyl - 1- piperazinyl)dibenzo[a,d] cycloheptadiene, M.P. 110–111° C., are obtained.

The 2 - cyano - 11 - (4 - methyl - 1 - piperazinyl)dibenzo[a,d]cycloheptadiene, M.P. 175° C., employed as starting material may be prepared as follows: 789 g. of methyl 2-(4-bromobenzyl)benzoate, M.P. 56° C., are prepared by esterification of 2-(4-bromobenzyl)benzoic acid (M.P. 137° C.) with methanol. This ester is reduced with 154 g. of potassium borohydride in 1400 cc. of tetrahydrofuran, to give 702 g. of 2-(4-bromobenzyl)benzyl alcohol (B.P. 165–167° C./0.2 mm. Hg). This alcohol is converted with hydrobromic acid (d=1.49) into 2-(4-bromobenzyl)benzyl bromide (855 g.), M.P. 72° C. This bromide is treated with 204 g. of potassium cyanide in ethanol to give 713 g. of crude 2-(4-bromobenzyl)phenylacetonitrile, which, when hydrolysed with 370 g. of potassium hydroxide in aqueous ethanol, gives 750 g. of 2-(4-bromobenzyl)phenylacetic acid, M.P. 166° C. 43.8 g. of 2-bromo-11-oxodibenzo[a,d]cycloheptadiene, M.P. 106° C., are prepared by cyclisation of 68 g. of the preceding acid in the presence of 165 cc. of orthophosphoric acid and 280 g. of phosphorus pentoxide.

3.2 g. of 2-cyano-11-oxodibenzo[a,d]cycloheptadiene, M.P. 145° C., are prepared by treatment of 7 g. of 2-bromo-11-oxodibenzo[a,d]cycloheptadiene with 11 g. of cuprous cyanide in 98 cc. of N-methylpyrrolidone. This derivative is reduced with potassium borohydride, which gives 3.2 g. of 2-cyano-11-hydroxydibenzo[a,d]cycloheptadiene as an oil. This alcohol is converted to 2-cyano-11-chlorodibenzo[a,d]cycloheptadiene, which is condensed in benzene medium with 1-methylpiperazine to give 2-cyano-11-(4-methyl-1-piperazinyl)dibenzo[a,d]cycloheptadiene.

The present invention includes within its scope pharmaceutical compositions which comprise at least one of the compounds of general Formula I, or non-toxic acid addition salt or quaternary ammonium derivative thereof, in association with a pharmaceutically acceptable carrier or coating. Such compositions will normally be administered orally, parenterally or rectally.

Solid compositions for oral administration include tablets, pills, powders and granules. In these compositions, one or more of the active compounds is, or are, admixed with one or more inert diluents, such as sucrose, lactose or starch. These compositions may also comprise, as is normal practice, substances other than inert diluents, e.g. lubricants, such as magnesium stearate.

Liquid compositions for oral administration include pharmaceutically acceptable emulsions, solutions, suspensions, syrups and elixirs containing inert diluents commonly used in the art, such as water or liquid paraffin. These compositions may also comprise substances other than inert diluents, for example wetting and suspending agents, and sweetening, flavouring, perfuming and preserving agents.

The compositions of the invention for oral administration also include capsules of absorable materials such as gelatin containing one or more of the active substances with or without the addition of diluents or excipients.

Preparations according to the invention for parenteral administration include sterile aqueous or non-aqueous solutions, suspensions, or emulsions. Examples of non-equeous solvents or suspending media are propylene glycol, polyethylene glycol, vegetable oils, such as olive oil, and injectable organic esters, for example ethyl oleate. These compositions may also contain adjuvants, such as preserving, wetting, emulsifying, and dispersing agents. They may be sterilized by, for example, filtration through a bacteriological filter, by incorporation of sterilising agents, by irradiation, or by heating. They may also be prepared in the form of steril solid compositions which may be dissolved at the time of use in sterile water or another sterile injectable medium at the time of use.

The percentage of active ingredient in the compositions of the invention may be varied, it being necessary that it should constitute a proportion such that a suitable dosage shall be obtained. A concentration of 5% to 95% by weight of active ingredient is generally suitable.

Compositions for rectal administration are suppositories which contain, in addition to the active compound, excipients such as cacao butter or suppository wax.

The doses used depend on the desired therapeutic effect, the route of administration and, the duration of treatment. When orally administered, generally between 5 mg. and 1000 mg. of active product per day for an adult is administered.

The following example exemplifies pharmaceutical compositions in accordance with the invention.

Example 2

Tablets having the following composition are prepared by the usual method:

| | Mg. |
|---|---|
| 2-acetyl-11-(4-methyl-1-piperazinyl)dibenzo[a,d]cycloheptadiene | 5 |
| Starch | 110 |
| Colloidal silica | 32 |
| Magnesium stearate | 3 |

I claim:
1. A dibenzo[a,d]cycloheptadiene of the formula:

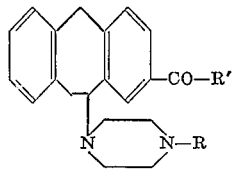

and its non-toxic acid addition salts, wherein R and R' are each alkyl of 1 to 5 carbon atoms.

2. A dibenzo[a,d]cycloheptadiene as claimed in claim 1, in the form of 2-acetyl-11-(4-methyl-1-piperazinyl)dibenzo[a,d]cycloheptadiene and its non-toxic acid addition salts.

References Cited
UNITED STATES PATENTS

| | | | |
|---|---|---|---|
| 3,052,721 | 9/1962 | Bernstein et al. | 260—268 X |
| 3,167,541 | 1/1965 | Van der Stelt | 260—268 X |
| 3,257,404 | 6/1966 | Fouche | 260—268 |
| 3,325,497 | 6/1967 | Fouche | 260—268 |

ALEX MAZEL, Primary Examiner

D. G. DAUS, Assistant Examiner

U.S. Cl. X.R.

260—256, 465, 515, 590, 618, 690; 424—250